United States Patent [19]
Greenwood

[11] Patent Number: 5,857,601
[45] Date of Patent: Jan. 12, 1999

[54] BEVERAGE HOLDER FOR A STROLLER OR THE LIKE

[75] Inventor: Mark H. Greenwood, Arlington Heights, Ill.

[73] Assignee: Graco Children's Products, Inc., Elverson, Pa.

[21] Appl. No.: 820,307

[22] Filed: Mar. 18, 1997

[51] Int. Cl.⁶ ..................................................... B60N 3/10
[52] U.S. Cl. ......................... 224/409; 224/547; 224/926; 248/311.2; 248/314
[58] Field of Search ..................... 224/409, 547, 224/926, 274, 270, 420; 248/311.2, 314

[56] References Cited

U.S. PATENT DOCUMENTS

| | | |
|---|---|---|
| D. 319,951 | 9/1991 | Frankel . |
| 2,628,054 | 2/1953 | Fazakerley . |
| 2,879,023 | 3/1959 | Barrier et al. . |
| 3,036,717 | 5/1962 | Johnson . |
| 3,113,677 | 12/1963 | Johnson . |
| 3,734,439 | 5/1973 | Wintz .................................. 248/314 X |
| 3,842,981 | 10/1974 | Lambert .................................. 224/926 |
| 4,203,175 | 5/1980 | Heine . |
| 4,256,281 | 3/1981 | Harris et al. . |
| 4,289,156 | 9/1981 | Ulics . |
| 4,410,115 | 10/1983 | McClain, Jr. et al. . |
| 4,431,154 | 2/1984 | Hamm . |
| 4,570,835 | 2/1986 | Criqui et al. . |
| 4,697,780 | 10/1987 | Wenkman et al. . |
| 4,844,400 | 7/1989 | Jasmagy, Jr. . |
| 4,856,744 | 8/1989 | Frankel . |
| 4,883,205 | 11/1989 | Saelens et al. .................... 248/311.2 X |
| 5,020,755 | 6/1991 | Frankel . |
| 5,052,649 | 10/1991 | Hunnicutt .............................. 248/311.2 |
| 5,143,335 | 9/1992 | Frankel . |
| 5,244,175 | 9/1993 | Frankel . |
| 5,320,263 | 6/1994 | Kobylack ................................ 224/274 |
| 5,400,990 | 3/1995 | Frankel . |
| 5,503,297 | 4/1996 | Frankel ................................ 224/409 X |

*Primary Examiner*—Renee S. Luebke
*Attorney, Agent, or Firm*—Olson & Hierl, Ltd.

[57] ABSTRACT

An improved beverage holder is provided that is particularly well suited for association with the handlebar of a stroller. The beverage holder includes a flattened U-configured clip that is removably positionable over the handlebar. The beverage holder also includes a receptacle. To engage the receptacle with the clip, the receptacle is provided with an outwardly projecting stub shaft having an enlarged head, and one leg of the clip is provided with a keyhole-type slot. When the enlarged head is extended through the enlarged upper end portion of the keyhole slot, the stub shaft is slidably movable in the narrow lower portion of the keyhole slot, thereby engaging the receptacle with the clip.

19 Claims, 6 Drawing Sheets

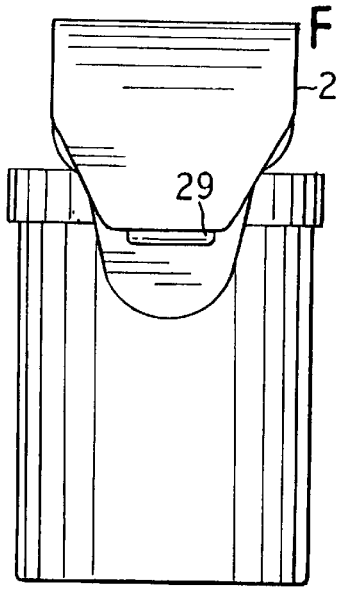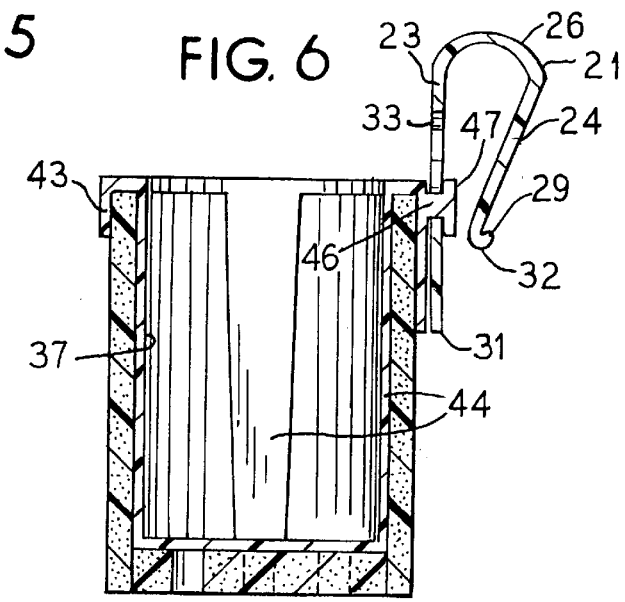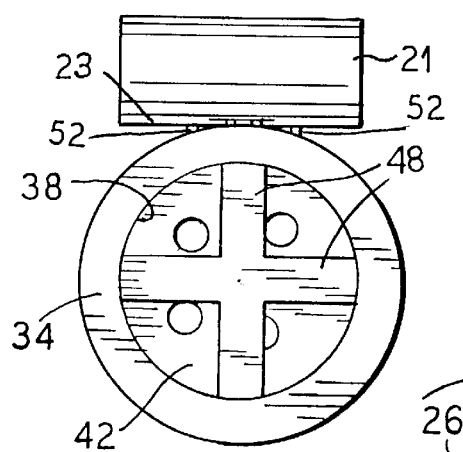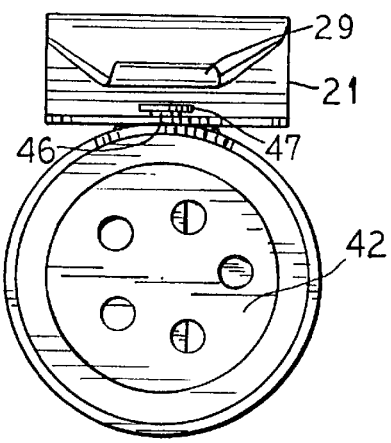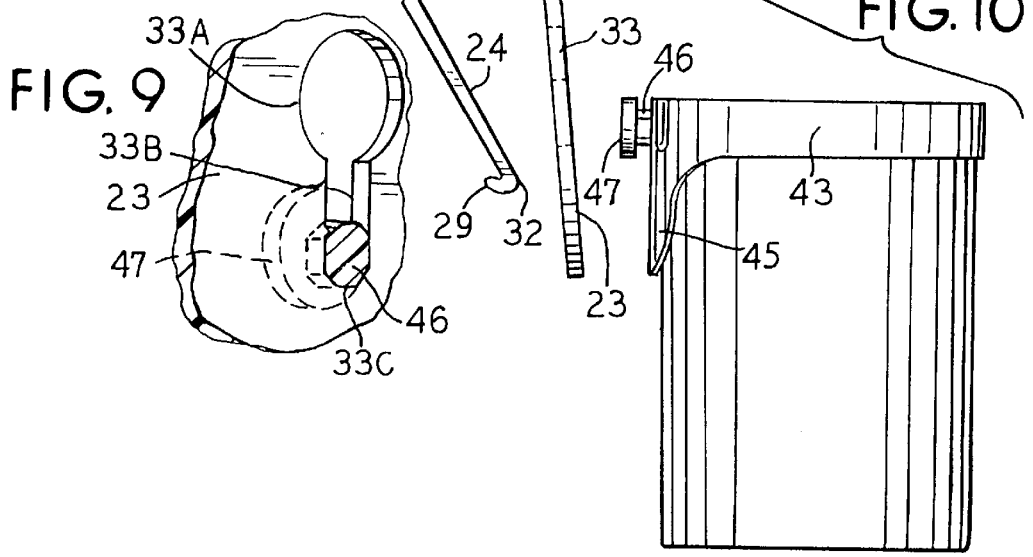

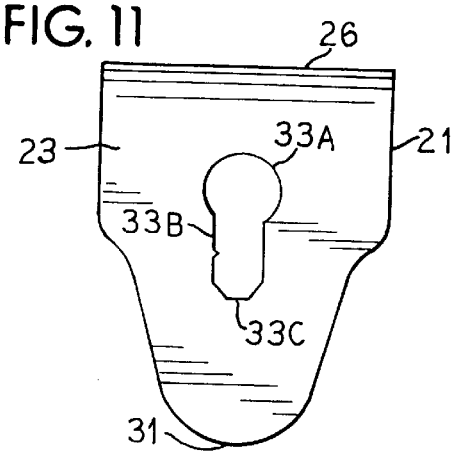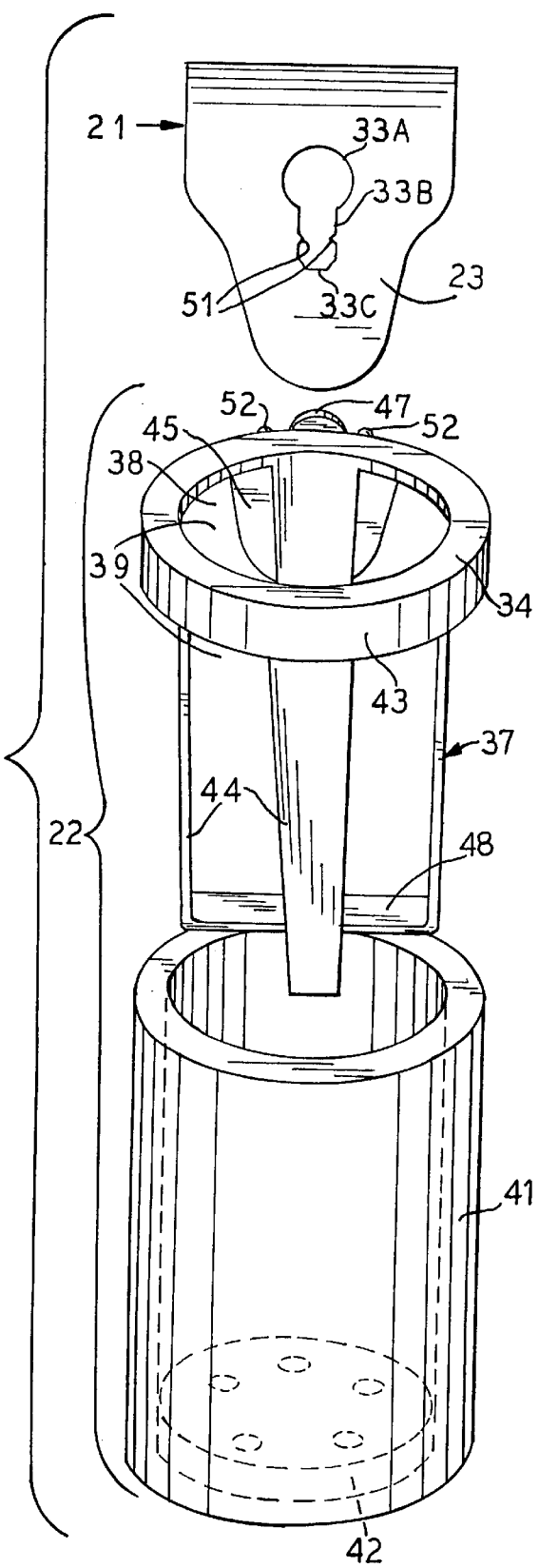

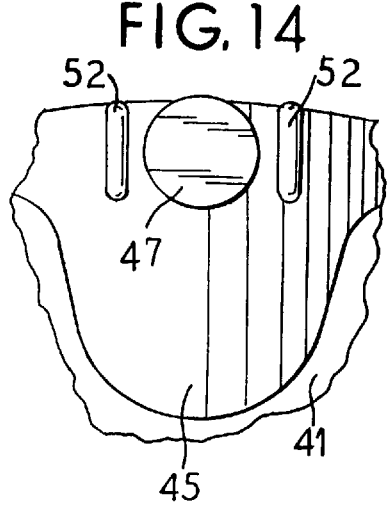
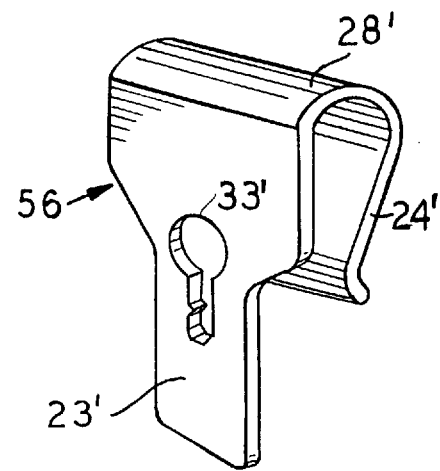
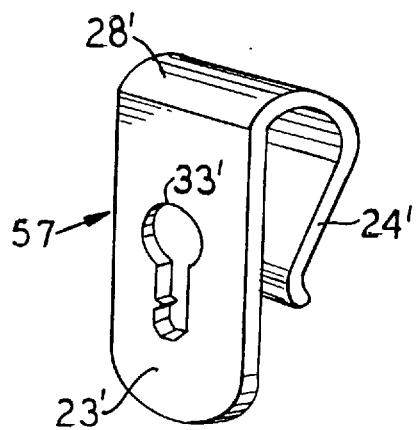
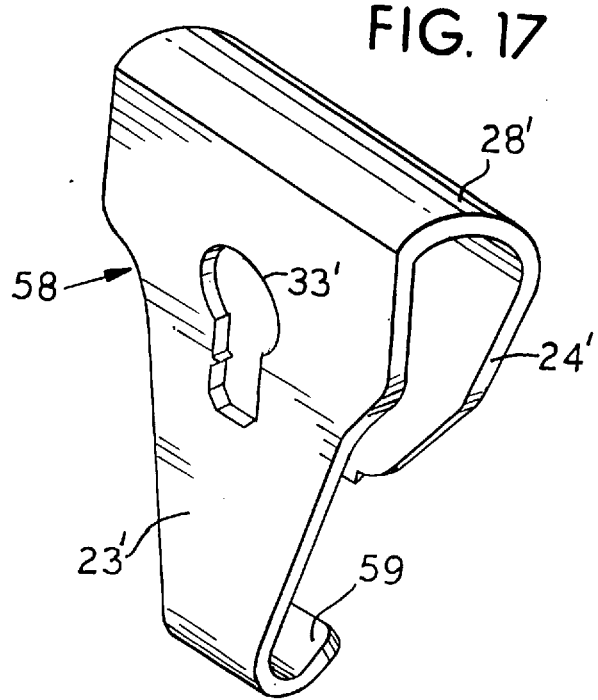

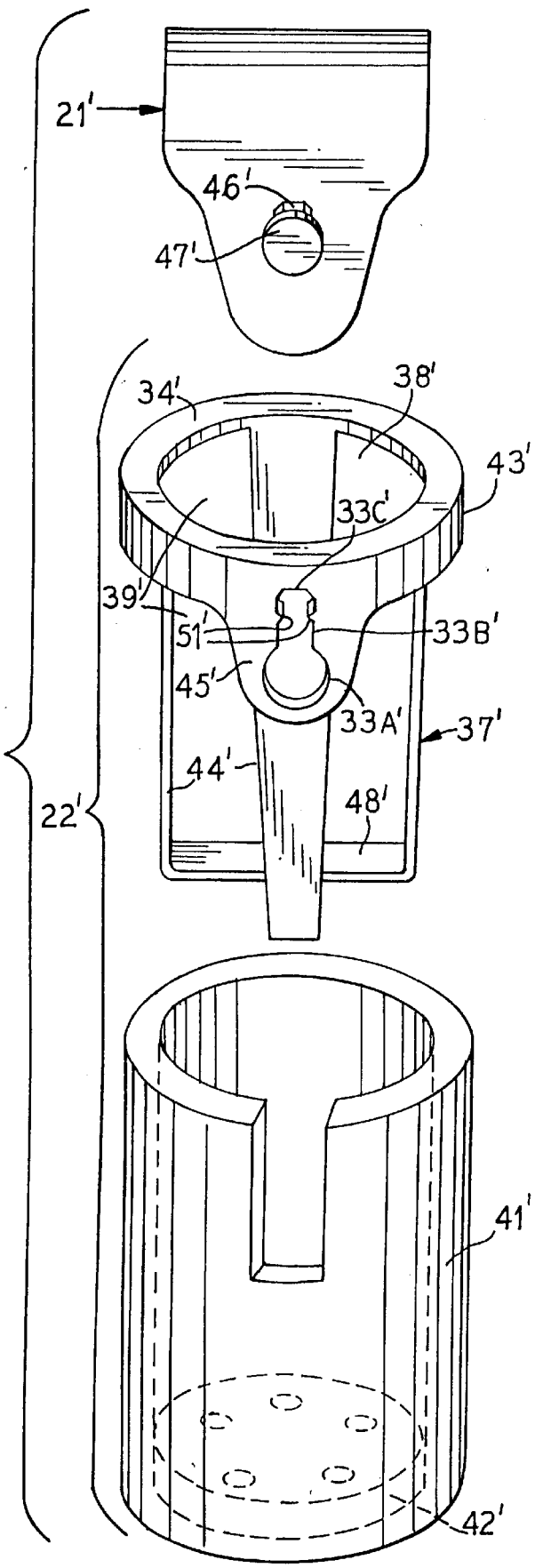

BEVERAGE HOLDER FOR A STROLLER OR THE LIKE

FIELD OF THE INVENTION

This invention relates to a beverage holder that can be associated with a stroller or the like.

BACKGROUND OF THE INVENTION

Beverage holders that can be detachably associated with various objects are known in the prior art. Representative examples include Frankel U.S. Pat. No. 5,400,990 and Johnson U.S. Pat. No. 3,113,677. Typically, a beverage holder incorporates a beverage container receptacle and an attachment clip.

Particularly in the situation where a beverage holder is associated with the horizontally extending handlebar of a stroller, the attachment clip for the holder needs to be readily connectable with the handlebar. Also, the beverage container receptacle needs to be readily associatable with, and detachable from, the clip. In addition, the walls of the beverage container receptacle need to be thermally insulated, preferably shock resistant, and also securely hand grippable. These needs are not well met by the beverage holders disclosed in the above-referenced prior art.

The present invention provides an improved beverage holder which is associatable with a stroller handlebar and which meets these needs very well, yet the holder is simple and reliable.

SUMMARY OF THE INVENTION

This invention is directed to a new and improved beverage holder that is particularly well adapted for association with the handlebar of a stroller or the like.

The beverage holder includes a U-configured clip that is adapted to be inverted over and hang from the handlebar of a stroller, for example.

The beverage holder also includes a beverage container receptacle that is associatable with one leg of the clip. This association is achieved by a cooperating combination of a keyhole-shaped slot defined in a portion of either a clip leg or the receptacle, and a slot-engaging, headed stub shaft that radially projects from the other member.

The clip is transversely flattened and is comprised of a unitary, relatively rigid but resilient material. In a preferred embodiment, the clip has two legs that are unitarily interconnected together at one pair of adjacent respective leg ends by an arcuately extending yoke head section. In such embodiment, each leg is substantially straight, and one leg is longer than the other. The longer leg has the keyhole-shaped slot defined therethrough and the slot is located in a mid-portion thereof.

Preferably, opposed sidewall portions of a channel of the keyhole-shaped slot are provided with small tabs which function to aid in detaining the stud shaft in engaged relationship with this slot. To aid in handlebar engagement, the shorter leg is inclined relative to the longer leg at an acute angle, and the outer end of the shorter leg has an integral, outwardly flared flange. After being extended over a stroller or like handle bar, the yoke head section is loosely associated with the handlebar while the clip legs downwardly depend therefrom.

Also in a preferred embodiment, the beverage container receptacle comprises a cage-type frame that is cross-sectionally cylindrical. The frame is comprised of a unitary, relatively rigid but resilient material. The frame includes a circumferentially extending mouth-defining top portion, a load-supporting bottom portion, and interconnecting side portions extending between the top and the bottom portions. Preferably, the clip and the frame are each separately formed and comprised of molded plastic.

Also, a radially-thickened, elastomeric sleeve is associated with, and exteriorly circumscribes, the frame. Preferably, this sleeve has an associated thickened bottom disk which includes vent holes defined therein.

The frame top portion preferably has a radially outwardly projecting, circumferentially extending lip region. A terminal downturned lip flange extends around the outer perimeter of the lip region. The headed stub shaft extends outwardly and radially from a portion of the frame, and that portion is preferably an outside region of the downturned lip flange. Also, such portion of the lip flange is downwardly locally distended for improved support. Further, abutments are provided on the lip flange, at least one on each circumferential side of the stub shaft. The abutments function to stabilize the receptacle against rocking or rolling relative to the clip. The stub shaft outer end is terminally provided with an associated enlarged, preferably flattened and circumferentially rounded head or button which retains the stub shaft in engaged relationship with portions of the keyhole slot.

The keyhole-type slot when in a clip leg has an enlarged upper head region and a downwardly extending interconnected slot region. The button of the stub shaft is configured to extend through the enlarged head region of the keyhole-type slot. With the button so extended, the stub shaft is configured for cooperative longitudinal sliding movements in and along the slot, thereby engaging the beverage container receptacle with the clip.

Preferably, the stub shaft has side walls comparable in cross-section to a regular polygon whose diametrical spacing is such that the stub shaft can be engaged with the keyhole slot region in various orientations, thereby permitting the receptacle to be associated with the clip at various inclined angles.

Thus, the clip is easily and reliably associated with, or disconnected from, the handlebar of a stroller or the like, and the beverage container receptacle is easily and reliably engaged with, or disengaged from, the clip.

The beverage holder is easy to use, reliable and relatively inexpensive to fabricate. The receptacle provides shock resistance and thermal insulation for beverage containers, such as a conventional chilled aluminum can or the like.

Other and further objects, aims, features, advantages, embodiments and the like will be apparent to those skilled in the art from the disclosures in the present specification and appended drawings.

BRIEF DESCRIPTION OF THE DRAWINGS

In the drawings:

FIG. 5 is a back side elevational view of the beverage holder of FIG. 2;

FIG. 6 is an axial vertical sectional view taken through the beverage holder of FIG. 2;

FIG. 7 is a top plan view of the beverage holder of FIG. 2;

FIG. 8 is a bottom plan view of the beverage holder of FIG. 2;

FIG. 9 is a fragmentary enlarged perspective view of the front face of the long leg in the keyhole-shaped slot region of the beverage holder of FIG. 2, but with the beverage container receptacle removed from the stub shaft;

FIG. 10 is a right side elevational exploded view of the clip and the beverage container receptacle of the beverage holder of FIG. 2;

FIG. 11 is an enlarged perspective view showing the front face of the clip of the beverage holder of FIG. 2;

FIG. 12 is an enlarged perspective view showing the back face of the clip of the beverage holder of FIG. 2;

FIG. 13 is a front side elevational exploded view of the beverage holder of FIG. 2 including the clip and the beverage container receptacle structure;

FIG. 14 is a fragmentary enlarged perspective view of the front side of the beverage container receptacle in the region of the button (with the clip removed) of the beverage holder of FIG. 2;

FIG. 15 is a perspective view showing the front side of the long leg of an alternative embodiment of a clip structure adapted for use in the beverage holder of FIG. 2;

FIG. 16 is a view similar to FIG. 15, but showing another alternative clip embodiment;

FIG. 17 is a view similar to FIG. 15, but showing a further alternative clip embodiment;

FIG. 18 is a view similar to FIG. 13, but showing an alternative beverage holder wherein the keyhole slot is associated with the receptacle and wherein the headed stub shaft is associated with the clip;

DETAILED DESCRIPTION

Figure 1:
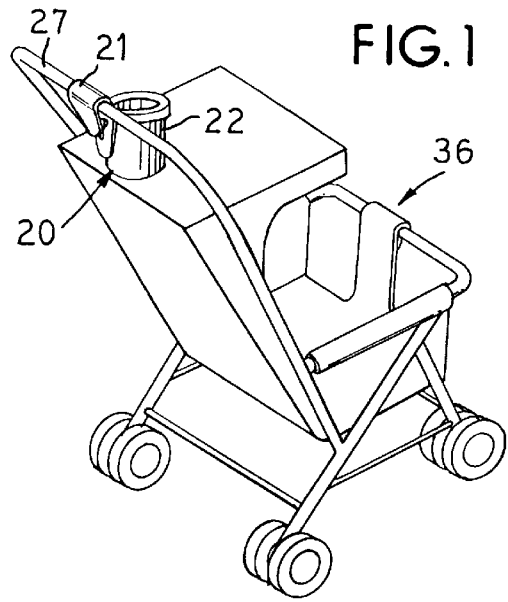
FIG. 1 is a perspective environmental view illustrating one embodiment of the beverage holder of this invention in association with an illustrative stroller.

Referring to the drawings, FIGS. 1–14 show one embodiment 20 of a beverage holder of this invention. The beverage holder 20 includes a clip 21 and a beverage container receptacle 22. The beverage holder 20 is shown in FIG. 1 with its clip 21 associated with the horizontally extending handlebar portion 27 of an infant stroller 36.

The clip 21 is transversely flattened, generally U-configured, and comprised of a unitary, relatively rigid but resilient material. This material can be, for example, plastic (preferred) or metal. Suitable plastics are preferably molded and can comprise, for example, a thermoplastic polymer, for example, a polyolefin, such a polypropylene, an acrylic resin, a styrene copolymer, such as an ABS resin, or the like. Suitable metals can comprise formed sheet metal, such as a coated spring steel, a stainless spring steel, or the like.

The clip 21 has two legs 23 and 24 that are interconnected together at one pair of adjacent respective ends by an integrally formed, arcuately extending yoke head section 26. Legs 23 and 24 are each, as shown, for example, in FIGS. 6 and 10, preferably substantially straight and flat in side elevation. Leg 23 preferably has a greater length than leg 24. The leg 24 can, if desired, be curved longitudinally when viewed in side elevation. For ease in installing clip 21 over handlebar portion 27, the leg 24 is optionally but preferably provided with a small, outturned terminal flange 29 on its outer end 32. Proceeding outwardly from yoke head section 26, the legs 23 and 24 in frontal elevation are each preferably progressively symmetrically inwardly tapered along their respective lateral outside edges proceeding from yoke head section 26 to their respective terminal or outer ends 31 and 32.

Leg 23 preferably has a keyhole-shaped slot 33 defined therein. Although slot 33 is shown located in a mid-region of leg 23, slot 33 can be alternatively located, for example, towards the outer end 31 of leg 23 or even in leg 24. The slot 33 has an enlarged upper or head end region 33A having a circular perimeter; a downwardly extending constricted interconnected elongated lower slot region 33B having generally spaced, parallel, opposed side edges; and a terminus 33C that is spaced from the head end 33A (see, for example, FIG. 11 or FIG. 13).

Clip 21 is adapted for connection with a handlebar. For example, referring to FIG. 1, clip 21 is adapted for being extended or inverted over the handlebar 27 of infant stroller 36. After extension over the handlebar 27, the clip arcuate yoke section 26 is loosely associated therewith while the respective associated clip legs 23 and 24 downwardly depend therefrom.

Figure 2:
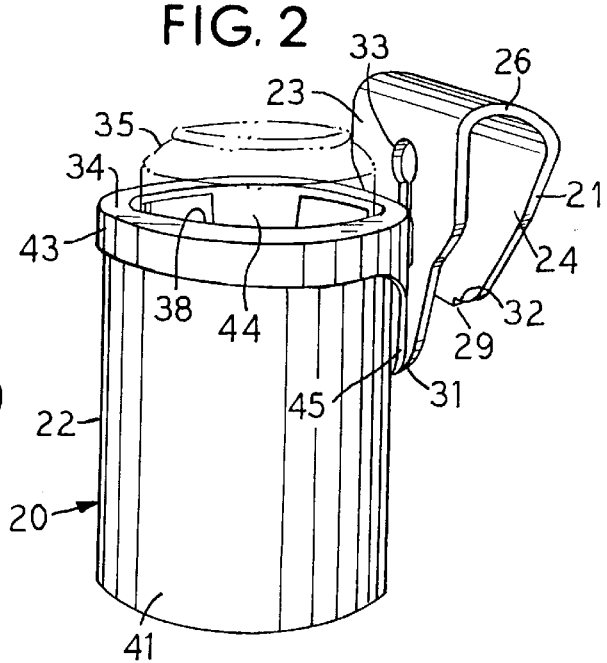
FIG. 2 is a perspective view of the beverage holder of FIG. 1 showing in phantom an illustrative conventional beverage container seated in the beverage container receptacle.
Figure 3:
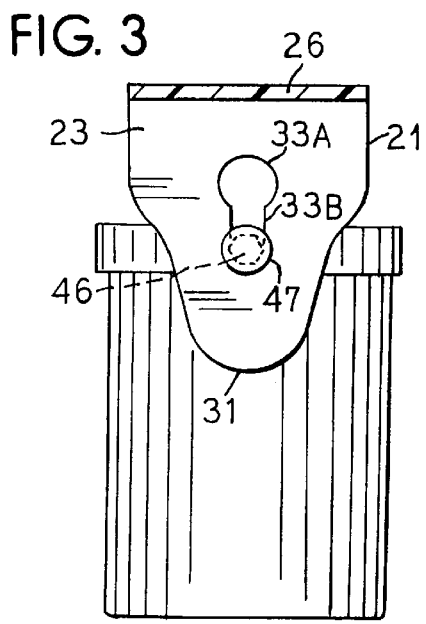
FIG. 3 is a vertical, transverse sectional view taken through the arcuate yoke interconnecting head section of the clip showing the back side of the beverage holder of FIG. 2, this section being taken adjacent to the back face of the clip long leg, thereby illustrating the suspension of the beverage container receptacle from a clip having a keyhole-shaped slot when a receptacle having a headed stub shaft is removably engaged with the clip.
Figure 4:
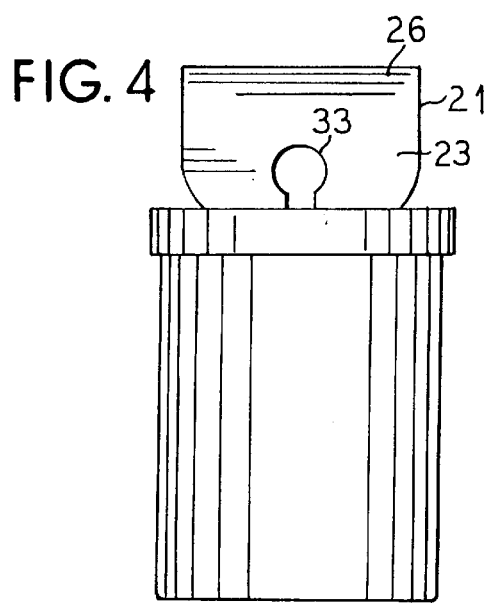
FIG. 4 is a front side elevational view of the beverage holder of FIG. 2.

The beverage container receptacle 22 can have various shapes and side elevational profile configurations. A presently preferred profile configuration is cylindrical. The beverage container receptacle 22 also can have various structures. In its presently preferred form, the beverage container receptacle 22 is adapted to receive and hold a conventional beverage can 35 as shown in FIG. 2. The beverage container receptacle 22 incorporates a cage-type skeletal frame 37 (see FIG. 13, for example) that is preferably comprised of a unitarily formed, relatively rigid but resilient material. Frame 37 can be comprised of plastic or metal similar to the clip 21 as described above.

As used herein, the term "cage-like" generally refers to a lattice work or frame work with rib-like members and open spaces typically existing between the rib-like members. Various frame structures can be used, but a present preference is to employ a plurality (here illustratively four) of longitudinally extending, circumferentially spaced flattened ribs 44. Each rib 44 is preferably slightly circumferentially arcuate to an extent sufficient to match the internal diameter of the cavity 39 defined in and by frame 37. Preferably, each rib 44 is symmetrically and longitudinally tapered along its opposite sides proceeding from top to bottom. The frame 37 includes a circumferentially extending and radially extending (radially flattened) mouth 38-defining rim rib 34. Each rib 44 is integrally joined at its upper end to rib 34 adjacent its inside circumferential edge. The bottom end of each rib 44 is perpendicularly joined integrally with a flattened, radially inwardly extending brace 48. These braces 48 integrally join together at the bottom center of frame 37 (see FIG. 7, for example).

The frame 37 thus has an open mouth 38 at its upper end, and its bottom is adapted for supporting the load of a full beverage can. The circular rib 34 of the frame 37 as shown preferably has a circumferentially extending flange 43 downwardly depending from the radially outer edge of the rib 34. Preferably, a tongue tab extension 45 projects downwardly from a lower edge portion of the flange 43.

A stub shaft 46 is associated with, and radially outwardly extends from, the beverage container receptacle 22. In beverage container receptacle 22, the stub shaft 46 is preferably integrally formed with the flange 43 so as to be preferably located on a portion of the flange 43 that is upwardly centered relative to tab extension 45. The stub shaft 46 is provided with an enlarged, preferably integrally formed, and preferably flattened and circumferentially rounded head or button 47. The outside diameter of the stub shaft 46 is preferably slightly less than the width of the slot region 33B and the button 47 has a diameter that is slightly less than the slot region 33A.

The radially outside wall portions of the ribs 44 are preferably substantially and completely covered by a continuously extending cylindrical sleeve 41. Preferably, the sleeve 41 is elastomeric and is slightly tensioned when slidably associated the sleeve 41 over the outside surfaces of the ribs 44. The sleeve 41 is radially-thickened and provides thermal insulation capability and shock absorption capability. Also, the sleeve is preferably readily graspable by a hand. While the sleeve 41 can be conveniently comprised of various plastics, it is most preferred for the sleeve 41 to be comprised of a foamed elastomer which is slightly stretched as it is mounted over the ribs 44. The radial thickness of the sleeve 41 is preferably such that the upper end portion of the sleeve 41 is adapted to be nestably received within the recess defined by flange 43, ribs 44 and rib 34 with the upper end of the sleeve 41 abutting against the adjacent surface portions of the rib 34.

The button 47 on stub shaft 46 is slidably extendable through the enlarged head 33A of slot 33. With the button 47 so extended through the head 33A, the stub shaft 46 is configured and located for cooperative longitudinal sliding movements in and along the slot 33B. The stub shaft 46 can be slidably moved downwardly in slot 33B into abutting engagement with terminus 33C. Thus, the beverage receptacle 22 is easily and conveniently engaged with the clip 21. Reversing the procedure disengages beverage receptacle 22 from the clip 21.

Preferably (and as shown), the stub shaft 46 has side portions that are cross-sectionally configured as a regular polygon, most preferably a hexagon. The interrelationship between the stub shaft 46 and the slot 33B is preferably such that, when the clip 21 and the beverage container receptacle 22 are each vertically oriented as shown, for example, in FIG. 13, an opposed pair of stub shaft 46 flattened opposite sides slidably engage opposed adjacent respective sides of slot region 33B (see FIG. 7, for example) with the stub shaft 46 being in abutting relationship with terminus 33C. Such an engaged relationship holds the receptacle 22 in a fixed orientation relative to clip 22.

Figure 19:
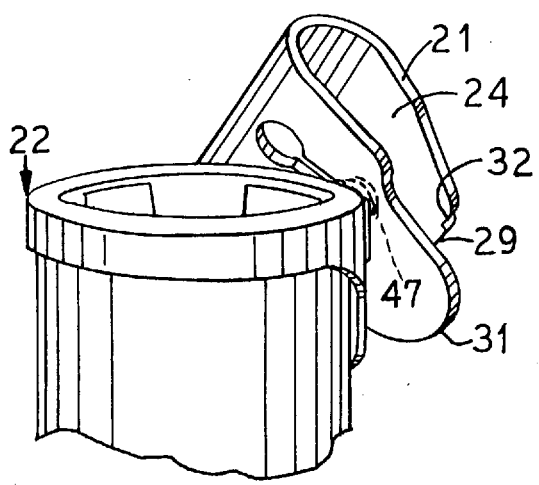
FIG. 19 is a fragmentary perspective view of the assembled beverage holder of FIG. 2, but showing the clip connected to the receptacle at an inclined orientation.
Figure 20:
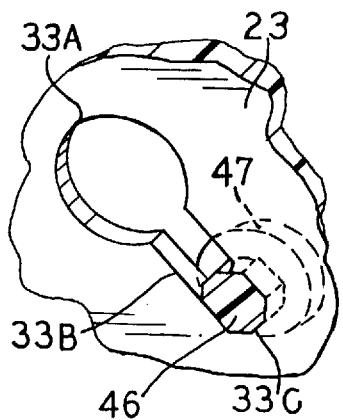
FIG. 20 is a view similar to FIG. 9 but showing the manner in which the clip connects with the receptacle when the assembly has the orientation illustrated in FIG. 19.
Figure 21:
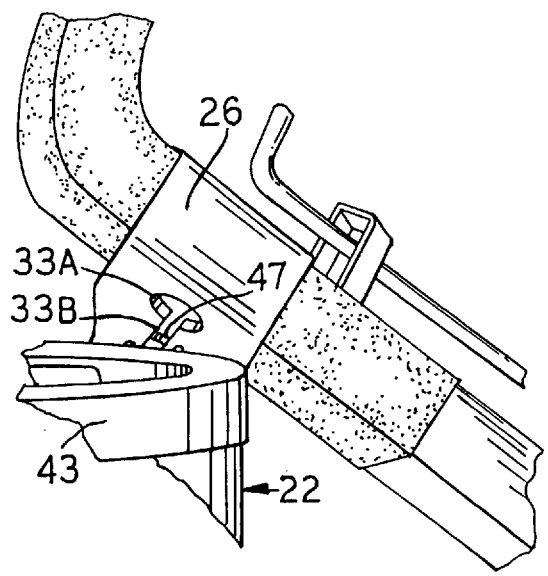
FIG. 21 is an enlarged fragmentary perspective environmental view of the upper right side of a stroller showing the clip of the assembled beverage holder of FIGS. 19 and 20 in association with the stroller handlebar's inclined side support arm.

The polygonally sided stub shaft 46 also permits the receptacle 22 to be engaged with the clip 22 at various respective spatial orientations, thereby to permit the clip to be associated with support means which is not horizontally oriented. For example, as illustrated in FIGS. 19–21, the clip 22 is at an inclined angle which permits the clip 22 to be extended over an inclined side support arm of a stroller while still allowing the clip-engaged receptacle 22 to be oriented with a generally vertical longitudinal axis and with a horizontally positioned mouth.

Also, as illustrated in FIG. 13, each opposite side of the slot region 33B preferably includes a small projection or tab 51 positioned in opposed relationship at a location just above the position occupied by the stub shaft 46 when the stub shaft 46 is in fully engaged contact with the terminus 33C. Such a pair of tabs 51 does not appreciably interfere with sliding movements of the stub shaft 46 in and along the slot region 33B. However, the tabs 51 do tend to stabilize and retain the stub shaft 46 in a fixed, fully associated, detained, locking-type engagement with the clip 21 when the stub shaft 46 abuts against the terminus 33C.

Further, abutments 52 are provided (paired) that are conveniently associated with the flange 43. Each abutment 52 is preferably in circumferentially equally spaced relationship to the stub shaft 46 and to the button 47. The abutments 52 radially outstand from the flange 43, as shown, for example, in FIG. 14. The abutments 52 are preferably integrally formed with the flange 43 and the frame 37. The radial height of each abutment 52 above the flange 43 is preferably selected so that, when the button 47 is extended through the head 33A, and the stub shaft 45 is engaged with, and moved downwards along, the slot region 33B, the adjacent outside surface portions of the leg 23 slidably engage the outside side edge portions of each abutment 52. Thus, the beverage container receptacle 22 is stabilized relative to the clip 21 particularly with regard to side-to-side rocking or rolling or pivoting action by the engaged receptacle 22 relative to the associated clip 21.

Alternative configurations for the clip 21 are illustrated in FIGS. 15, 16 and 17, and each respective alternative clip embodiment is identified, respectively, by the numerals 56, 57 and 58. For each clip embodiment, parts or portions similar to those existing in clip 21 are similarly numbered, but with prime marks for identification purposes. The arcuate yoke section 28' facilitates use of each clip in association with the receptacle 22.

The inventive beverage holder can be utilized in various applications and connections besides the handlebar of a stroller (as in FIG. 1). Thus, for example, an alternative clip can be adapted for insertion over a portion of the upper edge of a partially open automobile car door window pane (not shown), or the like. When so engaged, the clip leg 23' is preferably adapted to rest against the upper edge of such a window pane.

The alternative clip 58 is illustratively provided with a hook 59 at the outer end its leg 23'. Hook 59 is adapted for supporting a lightweight hanging article, such as the handles of a bag.

If desired, in a holder 20, the locations of the headed stub shaft 46 and of the keyhole slot 33 can be reversed. Thus, as shown in the alternative embodiment of the beverage holder 65 shown in FIG. 18, the slot 33 is located for example, in tab extension 45 and the stub shaft 46 is located on leg 23 (not shown). However, in such an arrangement as shown in holder 65, the spatial orientation of the keyhole slot 33' is reversed relative to the orientation of slot 33 in holder 20, as those skilled in the art will readily appreciate. In the holder 65, the receptacle 22' is suspended from the clip 21' and thus in effect the receptacle 22' must hang from the narrowed side portions of the keyhole slot 33', necessitating the reversal in the orientation of slot 33' relative that of slot 33. Orientation of the keyhole slot depends on the fact that the receptacle is being urged downwardly by gravity relative to the clip.

Other and further embodiments and component arrangements will be apparent to those familiar with the art. No unreasonable limitations are to be implied or inferred from the foregoing illustrations of this invention.

What is claimed is:

1. A beverage container holder for association with a bar, said beverage container holder comprising:

a generally U-configured clip having two legs that are connected at one pair of adjoining respective ends by a generally arcuately extending yoke section, said yoke section being removably and loosely positionable over a portion of said bar;

a beverage container receptacle comprising a frame portion and an insulative sleeve portion, said frame portion being a unitarily formed structure having an upper portion with a mouth defined therein, a bottom portion, and side portions extending between said upper portion and said bottom portion, said frame portion further having a flange portion that extends downwardly from said upper portion in outwardly spaced relationship to said side portions, and said insulative sleeve portion extending exteriorly over said side portions and in non-overlying relationship relative to said flange portion;

a keyhole-shaped slot having an enlarged head aperture and an interconnected elongated tail aperture, said slot being defined in one of either said flange portion or one of said legs; and a slot connector comprising a stub shaft having an enlarged terminal head, said stub shaft projecting outwardly from the other one of either said flange portion or said one leg;

whereby said slot connector is connectable with said slot through said slot head aperture, and, after said connecting, said stub shaft is slidably movable in a gravitationally downwards direction in said tail aperture, thereby to reversibly engage said clip with said receptacle so that said receptacle is suspended by said clip.

2. The beverage holder of claim 1 wherein said clip and also said frame portion are each comprised of relatively rigid, resilient plastic.

3. The beverage holder of claim 1 wherein said stub shaft is integrally joined to said flange portion and said keyhole-shaped slot is formed in one leg of said clip whereby said receptacle, when so engaged with said clip, hangs downwardly from said clip when said clip is so positioned over said bar.

4. The beverage holder of claim 1 wherein said sleeve portion also extends exteriorly over said bottom portion.

5. The beverage holder of claim 4 wherein said sleeve portion is comprised of formed elastomeric plastic and wherein said frame portion has a cross-sectionally circular configuration relative to a central axis.

6. The beverage holder of claim 5 wherein, in said receptacle, said frame portion incorporates a cage-type structure wherein said side portions are comprised of a plurality of circumferentially spaced, axially elongated rib members.

7. The beverage holder of claim 5 wherein, in said receptacle, said downturned flange portion extends circumferentially and continuously about said upper portion and includes in a localized region along a lower terminal portion thereof a downturned tab-like extension.

8. The beverage holder of claim 7 wherein said stub shaft is associated with said downturned flange portions so as to be centered and upwardly located relative to said tab-like extension, and said slot connector is defined in one of said legs.

9. The beverage holder of claim 8 wherein a pair of abutments are located on said downturned flange portion, each abutment being on a different side of said stub shaft, said abutments being adapted to slidably engage portions of said one leg on either side of said slot connector whereby said receptacle when engaged with said clip is stabilized against side to side rolling movement.

10. The beverage holder of claim 8 wherein said slot connector includes tab means adapted to aid in retaining said stub shaft in an engaged relationship with said slot connector.

11. A beverage container holder for association with a bar of a manually guided vehicle, said beverage container holder comprising:

a relatively rigid, resilient, transversely flattened, generally U-configured clip having two legs that are unitarily interconnected together at one pair of adjoining respective ends by a generally arcuately extending yoke section, said clip being removably and loosely positionable over a portion of said bar with said yoke section loosely contacting a portion of said handlebar means and with said legs extending downwardly;

one of said legs having a keyhole-shaped slot defined therethrough, said slot having an enlarged upper end portion and an interconnected elongated lower portion whose terminus is spaced from said upper end portion;

a beverage container receptacle comprising a frame portion and an insulative sleeve portion, said frame portion being a unitarily formed structure having an upper portion with a mouth defined therein, a bottom portion, and side portions extending between said upper portion and said bottom portion, said frame portion further having a flange portion that extends downwardly from said upper portion in outwardly spaced relationship to said side portions, and said insulative sleeve portion extending exteriorly over said side portions and in non-overlying relationship relative to said flange portion;

said receptacle having a stub shaft projecting transversely outwardly from said flange portion, said stub shaft having an enlarged outer head portion; and said outer head portion being receivable through said enlarged upper end portion and thereafter said stub shaft being cooperatively and slidably movable in said lower portion to abutment with said terminus, whereby said receptacle is removably engagable with said clip.

12. The beverage holder of claim 11 wherein said outer head portion is flattened and circumferentially rounded.

13. The beverage holder of claim 11 wherein said stub shaft is cross-sectionally configured as a regular polygon, and wherein the diametrical spacing between opposing pairs of sides of said polygon is about equal to the width of said elongated lower portion, whereby, when said outer end portion is so received through said enlarged upper end portion, said stub shaft can be angularly oriented relative to said elongated lower portion and a selected pair of said sides is slidably engagable with and movable in said lower portion, so that the angular orientation of said receptacle relative to said clip is selectable.

14. The beverage holder of claim 11 wherein said second leg is angularly inclined towards said one leg, said second leg is shorter than said one leg, and said second leg terminates in an outwardly flanged outer end for facilitating engagement of said clip with said bar.

15. The beverage holder of claim 11 wherein said keyhole-type slot is located generally in a mid-region of said one leg.

16. The beverage holder of claim 11 wherein said legs each have inwardly tapered respective sides proceeding downwardly from said adjoining ends.

17. The beverage holder of claim 11 whereinsaid side portions of said receptacle comprise longitudinally extending ribs that are slightly downwardly tapered from said mouth.

18. The beverage holder of claim 11 wherein the terminal end of one of said legs is formed into an upturned outwardly oriented hook that is in non-interfering relationship to said receptacle when said receptacle is so engaged with said clip.

19. A beverage holder for association with a handlebar of a manually guided vehicle, said beverage holder comprising:

(a) a relatively rigid, resilient, transversely flattened, generally U-configured, unitarily formed clip, said clip having two legs that are interconnected together at one pair of adjoining upper respective ends by a generally arcuately extending yoke section, said yoke section being removably positionable over a portion of said handlebar with said legs downwardly depending therefrom;

(b) a receptacle for a beverage container, said receptacle having a mouth at an upper end, an opposed bottom, and intervening side walls defining a cavity radially therewithin, said receptacle being generally cross-sectionally circular, said receptacle comprising:

a cage-type, relatively rigid, resilient skeletal frame defining said mouth, said bottom and said side walls, said frame having a downturned outer lip extending in adjacent radially spaced relationship circumferentially around said mouth, said frame being comprised of relatively rigid, resilient, unitarily formed plastic, and a sleeve circumferentially positioned about portions of said side walls, said sleeve being comprised of elastomeric, foamed plastic;

(c) a stub shaft unitarily and radially projecting transversely outwardly from a portion of said lip, said stub shaft having an enlarged flattened, peripherally circular outer head portion;

(d) a keyhole-shaped slot defined through one of said legs, said slot having an enlarged upper end portion and an interconnected elongated lower portion relative to said one leg, said lower portion having a width and a terminus that is spaced from said upper end portion;

(e) said outer head portion being receivable through said enlarged upper end portion and thereafter said stub shaft being cooperatively and slidably movable in said lower portion until abutment of said stub shaft with said terminus occurs, whereby said receptacle is removably engagable with said clip; and (f) said stub shaft being cross-sectionally configured as a regular polygon, and the diametrical spacing between opposing pairs of sides to said polygon being about equal to the width of said elongated lower portion, whereby, when said outer end portion is so received through said enlarged upper end portion, said stub shaft can be angularly oriented relative to said elongated lower portion and a selected pair of said sides is slidably engagable with and movable in said lower portion, so that the angular orientation of said receptacle relative to said clip is selectable.

* * * * *